(12) United States Patent
Kyogoku et al.

(10) Patent No.: US 8,118,359 B2
(45) Date of Patent: Feb. 21, 2012

(54) VEHICLE SEAT

(75) Inventors: Osamu Kyogoku, Dublin, OH (US); Daiju Nakagawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 12/250,969

(22) Filed: Oct. 14, 2008

(65) Prior Publication Data

US 2010/0090510 A1    Apr. 15, 2010

(51) Int. Cl.
A47C 13/00  (2006.01)
A47C 15/00  (2006.01)

(52) U.S. Cl. .............................. 297/105; 297/236; 297/1

(58) Field of Classification Search ................. 297/105, 297/108, 1, 248, 249, 236
See application file for complete search history.

(56) References Cited

U.S. PATENT DOCUMENTS

| | | | | |
|---|---|---|---|---|
| 362,720 | A | * | 5/1887 | Collins ............................ 297/43 |
| 808,679 | A | * | 1/1906 | Pickles ........................... 297/236 |
| 1,643,236 | A | | 9/1927 | Bell .............................. 297/236 |
| 2,116,366 | A | * | 5/1938 | Scott .............................. 297/43 |
| 2,509,551 | A | * | 5/1950 | Woods ........................... 297/236 |
| 2,699,202 | A | * | 1/1955 | Leary et al. ................... 297/233 |
| 2,740,463 | A | | 4/1956 | Young |
| 4,436,270 | A | | 3/1984 | Muraishi |
| 4,496,189 | A | * | 1/1985 | Tanizaki et al. ................. 297/63 |
| 4,768,832 | A | | 9/1988 | Wain |
| 4,856,844 | A | | 8/1989 | Isono |
| 4,881,702 | A | | 11/1989 | Slettebak |
| 5,193,765 | A | | 3/1993 | Simpson et al. |
| 5,384,946 | A | | 1/1995 | Sundstedt et al. |
| 5,758,926 | A | | 6/1998 | Wilkie et al. |
| 5,810,290 | A | | 9/1998 | Merensky et al. |
| 5,871,255 | A | | 2/1999 | Harland et al. |
| 6,425,619 | B2 | | 7/2002 | Ney |
| 6,568,754 | B1 | | 5/2003 | Norton et al. |
| 6,572,188 | B2 | | 6/2003 | Ozawa |
| 7,014,241 | B2 | | 3/2006 | Toyota et al. |
| 7,093,904 | B1 | * | 8/2006 | McMillen ................ 297/411.37 |
| 7,137,663 | B2 | | 11/2006 | Tsujibayashi et al. |
| 7,232,174 | B1 | | 6/2007 | Trott |
| 7,490,896 | B2 | * | 2/2009 | Smith ........................... 297/235 |
| 2004/0032154 | A1 | | 2/2004 | Menon et al. |
| 2004/0070243 | A1 | | 4/2004 | Cha |
| 2006/0076795 | A1 | | 4/2006 | Slade |

FOREIGN PATENT DOCUMENTS

JP          57022922       2/1982
WO        WO 92/03306    3/1992

* cited by examiner

*Primary Examiner* — Sarah B McPartlin
(74) *Attorney, Agent, or Firm* — Plumsea Law Group, LLC (57) ABSTRACT

A vehicle seat can be configured to include a variety of types of cushions. The seat may include primary and secondary cushions that are joined together such that the secondary cushion has a stored position under the seating surface of the primary seat cushion and a deployed position where the secondary seat cushion is positioned adjacent the primary seat cushion. The effective width of the seat may be greater when it is in one position than when it is in the other position. The back cushion may include first and second portions and a third portion intermediate the first and second positions. A vehicle may include left, right, and middle seats, the middle seat being configured to have two positions, the effective width of the middle seat in one position being greater than in the other position.

9 Claims, 14 Drawing Sheets

VEHICLE SEAT

BACKGROUND OF THE INVENTION

1. Field of the Invention

The present invention relates generally to seats and more particularly to vehicle seats having multiple configurations.

2. Description of Related Art

Many passenger vehicles, such as, but not limited to, minivans and sport utility vehicles (SUVs), include multiple rows of seating. The rear passenger seating in these vehicles is often complicated because of the variety of uses of the seats. Many vehicles include seating that can be moved into a variety of configurations. Some vehicles allow seating to be stored in the floor area of the vehicle. Other vehicles have seats with seatbacks that fold flat and become armrests or tables/consoles with storage areas, such as cup holders. Some vehicles have seats that can be removed from the vehicle completely or slid along a track.

One configuration includes a set of seats, such as, a left side seat, a right side seat and a middle seat. The seats can have differing widths. The left seat and right seat may be comparatively wider than the middle seat. When the left and right seats are positioned on the vehicle floor without the middle seat, a space is defined therebetween. The space can be used to store items, such as luggage or larger articles. Alternatively, the space can be filled with an accessory of the vehicle, such as a middle seat, table, console, etc.

The middle seat has a smaller width than the space between the left and right seats. This allows the user to easily install the middle seat without interference from the left seat or right seat. However, the use of a seat of that size means that a gap remains between the middle seat and each of the left seat and the right seat. These gaps are undesirable as items can get caught between the seats and their appearance is unappealing. It is also undesirable to size the middle seat to fit tightly between the left seat and the right seat, as such a configuration would create too much difficulty in installation.

A variety of types of child restraint seats are frequently used in rear passenger seats. Many newer child restraint seats include ISOFIX/LATCH (Lower Anchors and Tethers for CHildren) attachment systems. These child restraint seats include latches that releasably engage anchors on a vehicle. The use of the ISOFIX/LATCH system allows a child restraint seat to be positioned in a predictable location relative to a seat. When such a child restraint seat is used, the position of the seat in the vehicle is irrelevant to the safety of the child. However, if a child restraint seat is used that is not equipped with an ISOFIX/LATCH system, it is important that the seat be positioned to allow it to be secured with a seatbelt secured to a roof or side of a vehicle. Such a configuration can be complicated, as the seatbelt must be positioned at a particular location relative to the child restraint seat. This can make ingress and egress to the rear area of the vehicle difficult.

The exemplary embodiments described herein identify configurations that improve ingress/egress from the rear passenger area and minimize the spaces between the seats while maintaining the flexibility of known seating arrangements.

SUMMARY OF THE INVENTION

A vehicle seat, in one aspect, can include a seat base, a primary cushion, and a secondary seat cushion. The primary seat cushion has a seating surface and is supported at a vertical height on the seat base. The secondary seat cushion has a seating surface, a stored position, and a deployed position. The secondary seat cushion is secured to the primary seat cushion. In its stored position, the secondary seat cushion is positioned under the primary seat cushion's seating surface. In its deployed position, the secondary seat cushion is positioned adjacent the primary seat cushion. The vertical height of the primary seat cushion remains constant when the secondary seat cushion is in its stored and deployed positions.

In another aspect, the vehicle seat includes a seat base and a seat cushion removably attached to the seat base. The seat cushion can be configured to attach to the seat base in both a first position and a second position. The effective width of the seat cushion may be greater in one of the positions than in the other position.

In another aspect, a vehicle seat includes a seat cushion and a back cushion. The back cushion includes first, second, and third portions. The first and second portions both include inner edges and outer edges and are each positionable in a retracted position and an expanded position. The third portion of the back cushion may be positioned intermediate the first and second portions. The inner edges of the first and second portions may be adjacent each other when the first and second portions are in the retracted position. The inner edges of the first and second portions may be separated from one another in the expanded position. The third portion may bridge the first and second portions when the seat back is in its expanded position.

In another aspect, a vehicle can include a left seat, a middle seat, and a right seat. The right seat may be spaced laterally from the left seat and the middle seat may be disposed between the right seat and the left seat. The middle seat may have a first position and a second position. The middle seat may have an effective width that is greater in its first position than in its second position. The left, right, and middle seats may have substantially the same height in the first and second positions.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The exemplary embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

As shown in FIGS. 1-7, a first exemplary embodiment includes a set of seats 110. The seats 110 include a seat 112 for a vehicle that is described in detail herein. On a left side 114 of the seat 112 is a left seat 116 that includes a left seat cushion 118, a left back 120, and a left base 122. On a right side 124 of the seat 112 is a right seat 126 that includes a right seat cushion 128, a right back 130, and a right base 132. Each of the seat 112, the left seat 116, and the right seat 126 may be separable from a vehicle floor 134. In one exemplary embodiment, the seats 110 may form a second row of seats in a minivan-type vehicle. However, the seats could be positioned anywhere within any vehicle.

Figure 1:
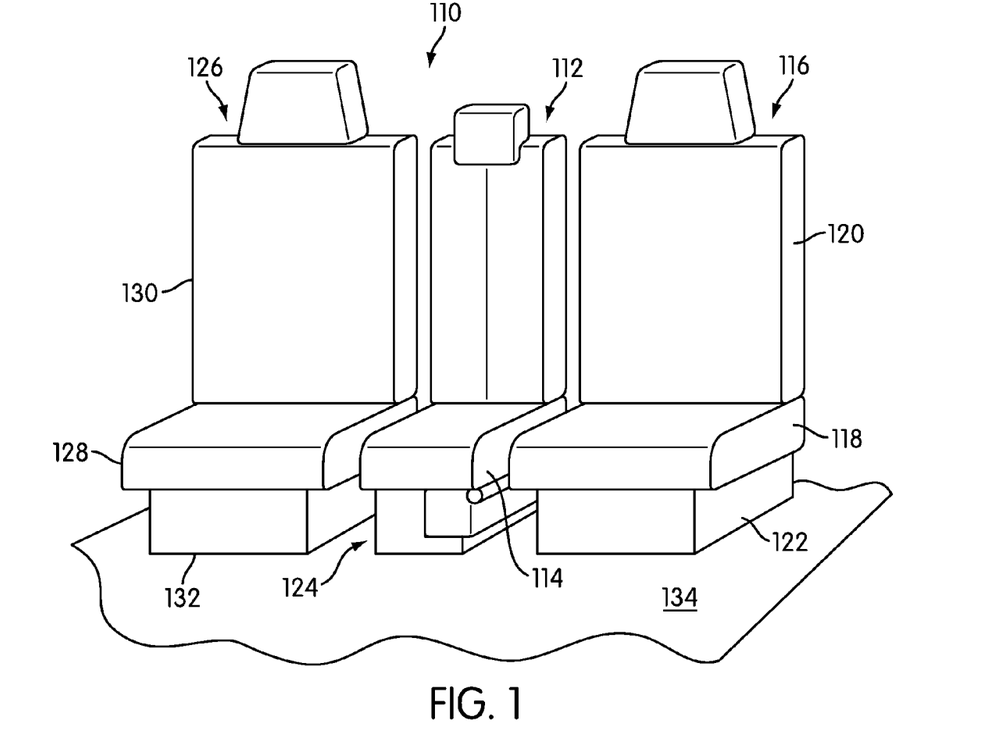
FIG. 1 is a perspective view of a first exemplary embodiment incorporated in a vehicle as a portion of a second row seat.
Figure 2:
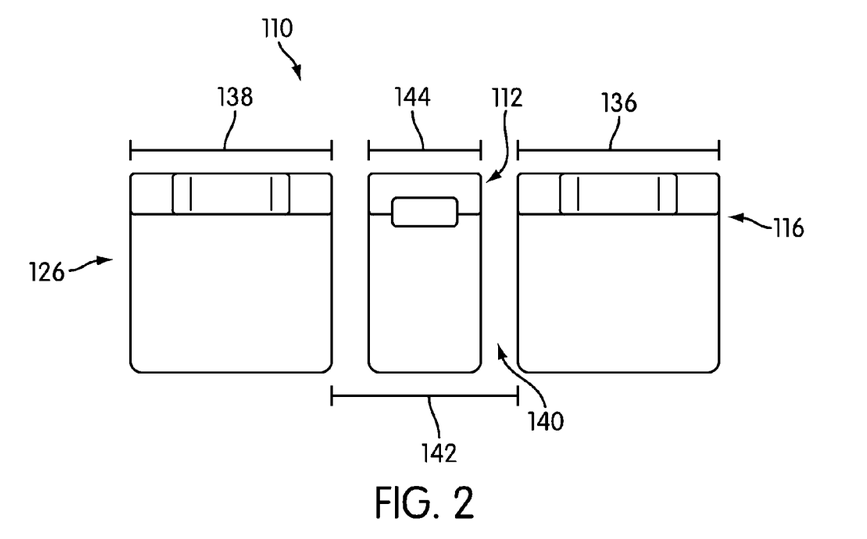
FIG. 2 is a top view of a first exemplary embodiment incorporated in a vehicle as a portion of a second row seat.
Figure 3:
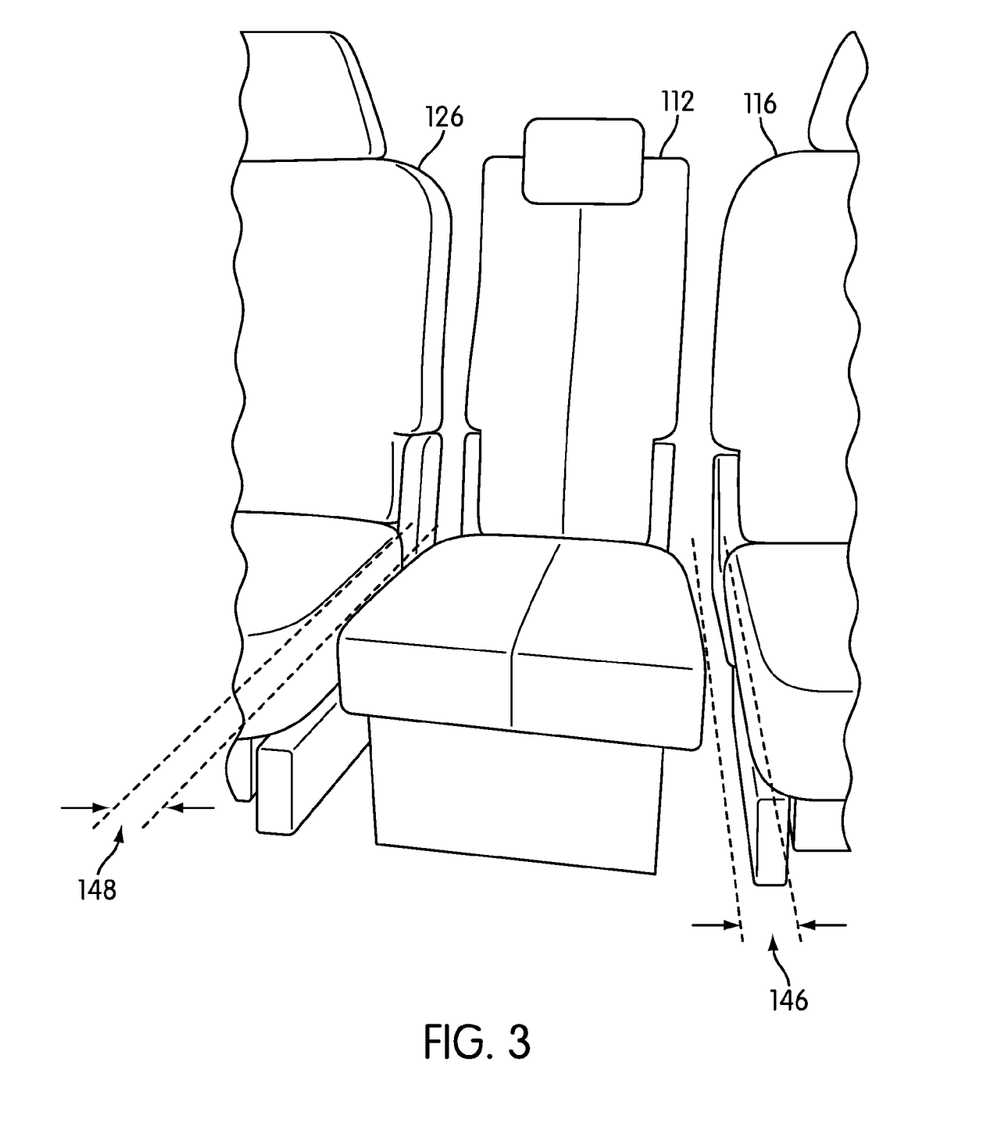
FIG. 3 is a perspective view of a second exemplary embodiment incorporated in a vehicle as a portion of a second row seat.

FIG. 2 is a top view of the seats 110 of FIG. 1. Left seat 116 has a width 136 and right seat 126 has a width 138. The widths of the seats may be dissimilar. Left seat 116 and right seat 126 may be comparatively wider than seat 112. Left seat 116 and right seat 126 may be designed to be mirror images of one another, in which case width 136 and width 138 will be similar, tending to differ only in the amount of acceptable tolerances in the manufacturing processes. When the left and right seats 116, 126 are positioned on the vehicle floor 134, there is a gap 140 having a width 142 therebetween. The seat 112 may have a width 144 that is less than the width 142 of the gap 140. Spaces 146 and 148 may remain between the seat 112 and each of the left seat 116 and the right seat 126, respectively, when the seat 112 is in a normal position.

In the first exemplary embodiment, the seat 112 includes a seat base 152. A primary seat cushion 154 may be supported at a vertical height 156 on the seat base 152. The primary seat cushion 154 functions as the lower seat cushion to support a user and includes a seating surface 158 that a user can occupy. The seat 112 further includes a back cushion 160 against which a user can lean when seated on the seat 112. The seat 112 may further include a headrest 162 and other features, such as armrests, a lumbar support, seat heaters, and the like, that are common to vehicle seats generally, but which are not shown in the Figures.

Figure 4:
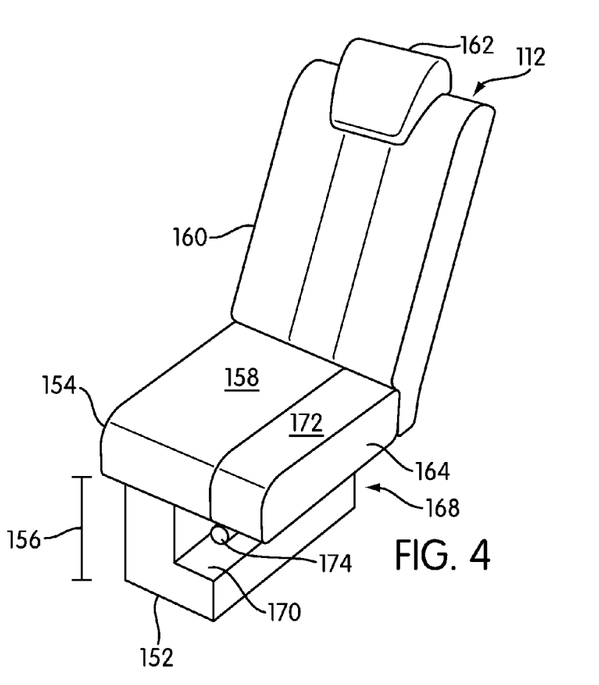
FIG. 4 is a perspective view of a first exemplary embodiment of an adjustable width seat with a secondary seat cushion in a deployed position.
Figure 5:
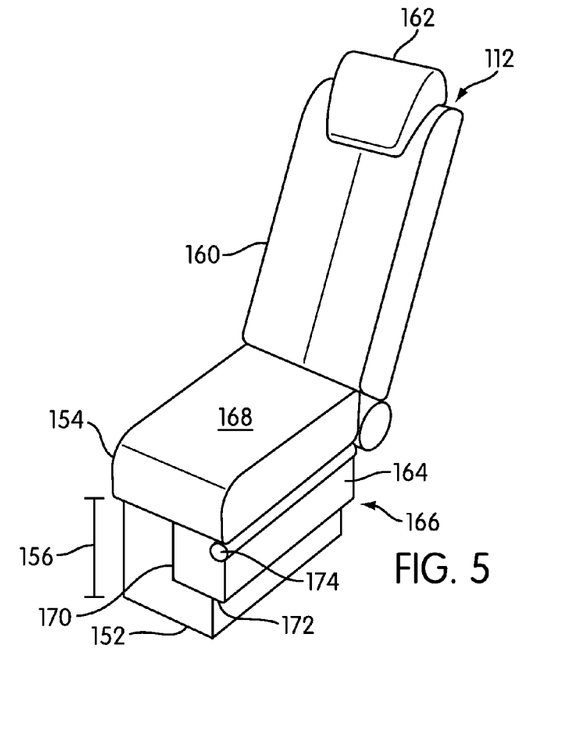
FIG. 5 is a perspective view of the first exemplary embodiment of an adjustable width seat with a secondary seat cushion in a stored position.
Figure 6:
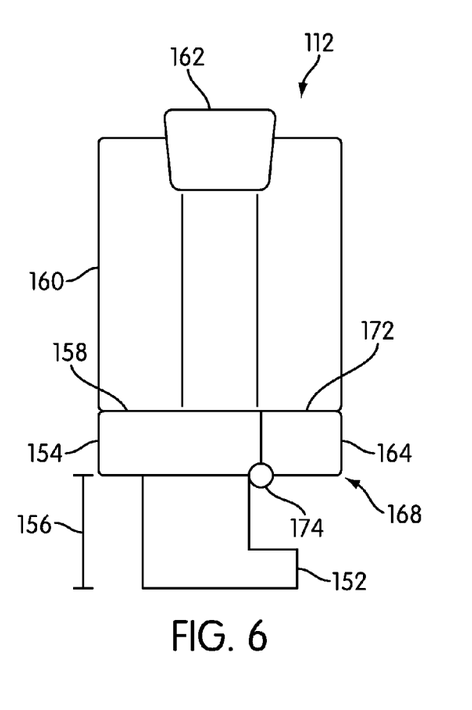
FIG. 6 is a front view of a first exemplary embodiment of an adjustable width seat with a secondary seat cushion in a deployed position.
Figure 7:
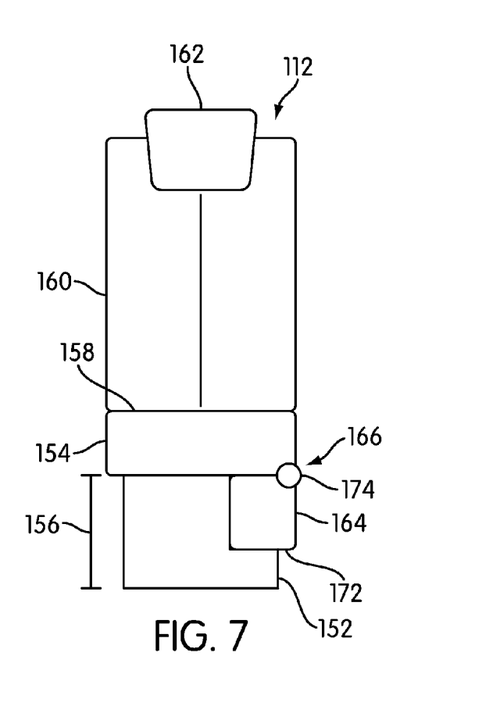
FIG. 7 is a front view of a first exemplary embodiment of an adjustable width seat with a secondary seat cushion in a stored position.

In addition to these features, the seat 112 includes a secondary seat cushion 164. The secondary seat cushion 164 may be secured to the seat 112 with any appropriate structure that allows the secondary seat cushion to move between a stored position 166 and a deployed position 168. FIGS. 4 and 6 show the seat where the secondary seat cushion 164 is in its deployed position 168. FIGS. 5 and 7 show the seat where the secondary seat cushion 164 is in its stored position 166. In the exemplary embodiment as shown in FIGS. 1-7, the secondary seat cushion 164 may be hingedly connected to the primary seat cushion 154.

In its stored position 166, the secondary seat cushion 164 may be positioned under the seating surface 158 of the primary seat cushion 154 and may be positioned entirely under the primary seat cushion 154. The seat base 152 may define a recess 170 therein. The secondary seat cushion 164 can be sized and shaped to be positioned in the recess 170 in the seat base 152 in the stored position.

In its deployed position 168, the secondary seat cushion 164 may be positioned adjacent the primary seat cushion 154. In one exemplary embodiment, the secondary seat cushion 164 includes a seating surface 172. In the deployed position 168, the seating surface 172 of the secondary seat cushion 164 may be placed adjacent the seating surface 158 of the primary seat cushion 154. In the exemplary embodiment shown in FIGS. 1-7, the secondary seat cushion 164 is placed beside the primary seat cushion 154 in the deployed position 168.

As can be seen most clearly by comparing FIGS. 6 and 7, the vertical height 156 of the primary seat cushion 154 may remain substantially constant when the secondary seat cushion 164 is in its stored 166 and deployed 168 positions. As can also be seen in these two Figures, the primary seat cushion 154 may slide or move laterally with respect to the base 152. The seat may be positioned so that the weight of the seat and any user would be distributed evenly across the base 152.

Additional structure(s) may be provided that lock or hold the parts of the seat 112 in the various configurations. For example, the hinge 174 can include one or more springs (not shown) that urge the secondary cushion 164 into one of the stored 166 and deployed 168 positions. The elements that allow the primary cushion 154 to move laterally may include a lock structure that secures the cushion 154 in position relative to the seat base 152. Such a slide and lock structure could be a structure similar to that used in conjunction with other seats that are permitted to have varying positions, such as the driver's seat.

A second exemplary embodiment is shown in FIGS. 8-12. As seen most clearly in FIG. 8, this exemplary embodiment includes a set of seats 210. The seats 210 include a seat 212 for a vehicle that is described in detail herein. On a left side 214 of the seat 212 is a left seat 216 that includes a left seat cushion 218, a left back 220, and a left base 222. On a right side 224 of the seat 212 is a right seat 226 that includes a right seat cushion 228, a right back 230, and a right base 232. Each of the seat 212, the left seat 216, and the right seat 226 may be separable from a vehicle floor 234. In this exemplary embodiment, the seats 210 may form a second row of seats in a minivan-type vehicle. However, the seats could be positioned anywhere within any vehicle.

Figure 8:
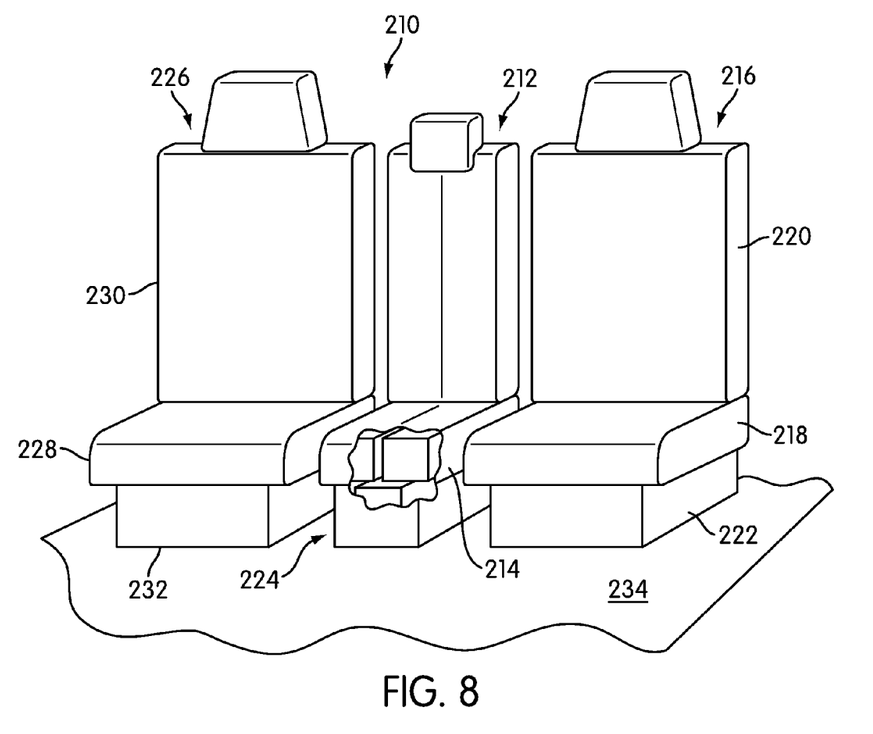
FIG. 8 is a perspective view, partially in cutaway of a second exemplary embodiment incorporated in a vehicle as a portion of a second row seat.
Figure 9:
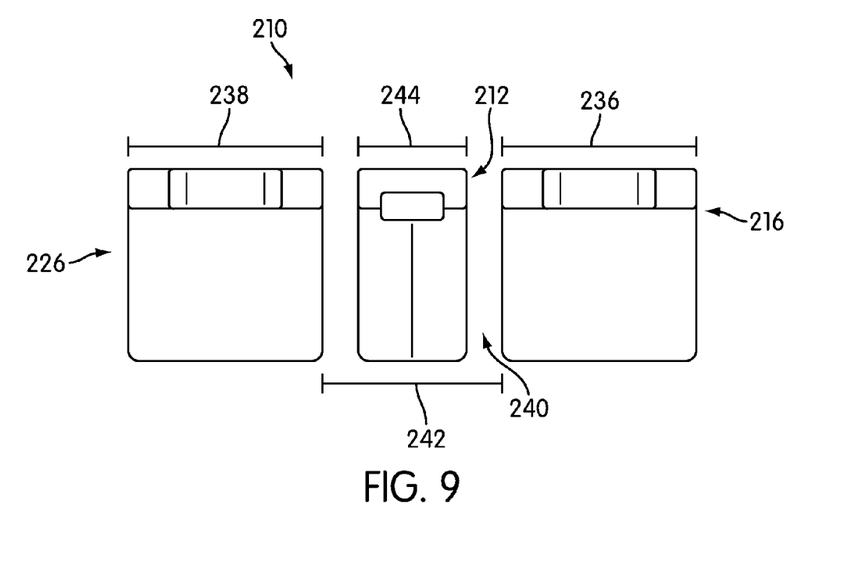
FIG. 9 is a top view of a second exemplary embodiment incorporated in a vehicle as a portion of a second row seat.

FIG. 9 is a top view of the seats 10 of FIG. 8. Left seat 216 has a width 236 and right seat 226 has a width 238. The widths of the seats may be dissimilar. Left seat 216 and right seat 226 may be comparatively wider than seat 212. Left seat 216 and right seat 226 may be designed to be mirror images of one another, in which case width 236 and width 238 will be similar, tending to differ only in the amount of acceptable tolerances in the manufacturing processes. When the left and right seats 216, 226 are positioned on the vehicle floor 234, there is a gap 240 having a width 242 therebetween. The seat 212 may have a width 244 that is less than the width 242 of the gap 240. Spaces 246 and 248 may remain between the seat 212 and each of the left seat 216 and the right seat 226, respectively, when the seat 212 is in a normal position.

Figure 10:
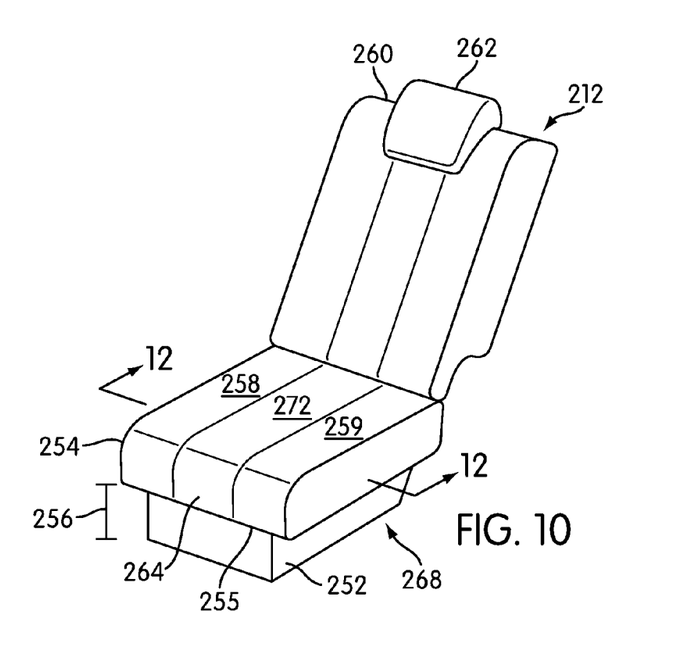
FIG. 10 is a perspective view of a second exemplary embodiment of an adjustable width seat in a deployed position.
Figure 11:
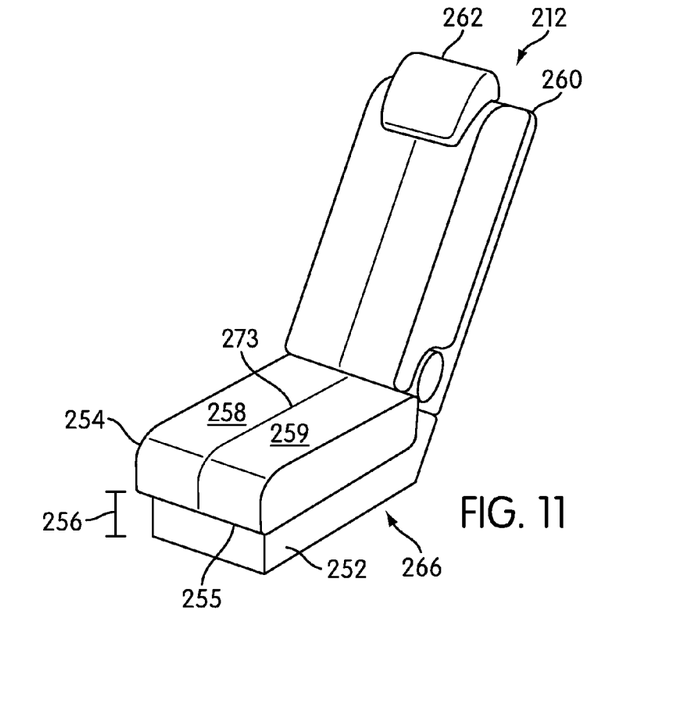
FIG. 11 is a perspective view of a second exemplary embodiment of an adjustable width seat in a stored position.
Figure 12:
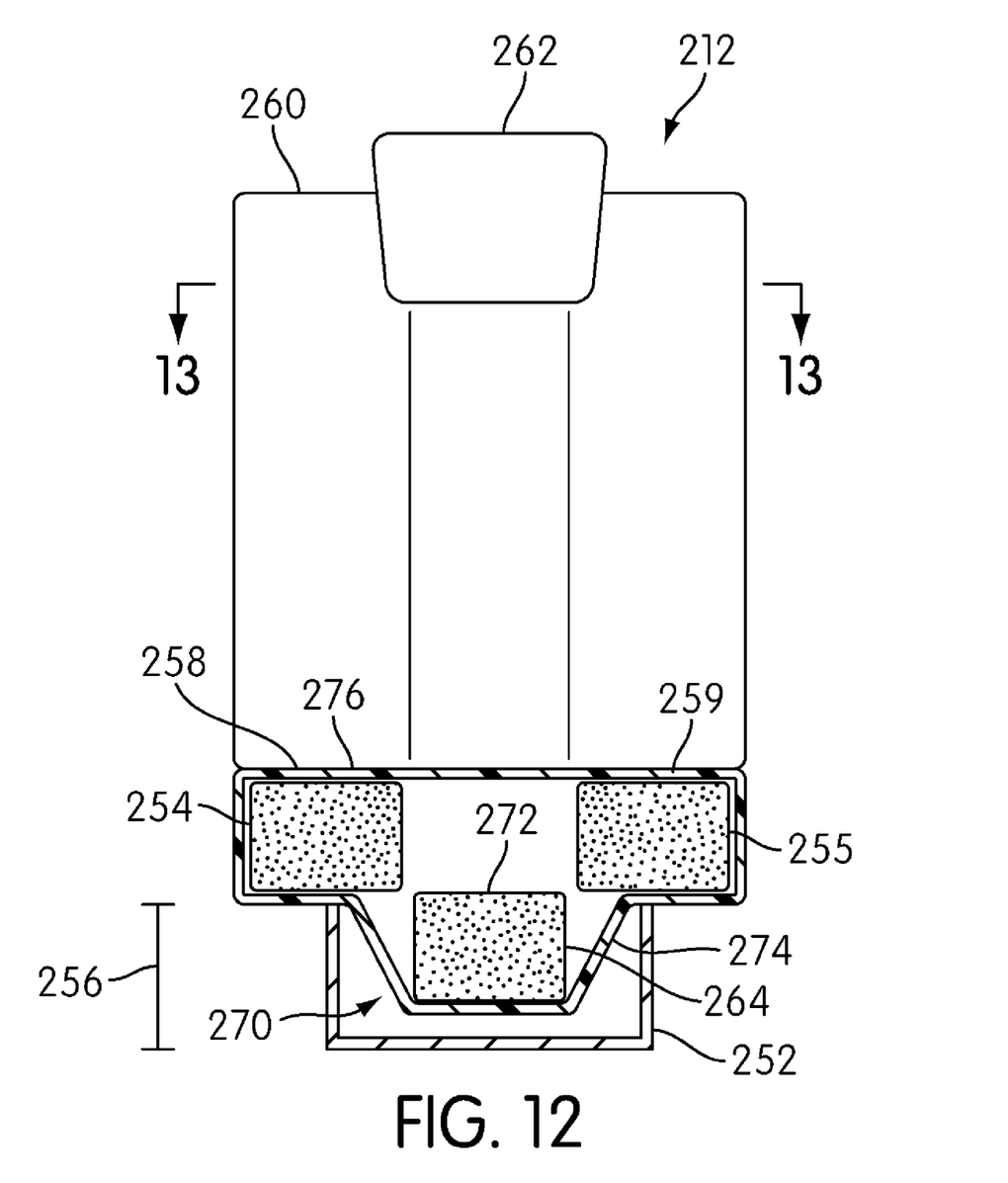
FIG. 12 is a front view, partially in section, of a second exemplary embodiment of an adjustable width seat in an expanded position.

The seat 212 is shown in greater detail in FIGS. 10-12. This exemplary embodiment includes a seat 212 for a vehicle. The seat 212 includes a seat base 252. A primary seat cushion 254, 255 is supported at a vertical height 256 on the seat base 252. The primary seat cushion 254, 255 functions as the lower seat cushion to support a user and includes a seating surface 258, 259 that a user can occupy. The seat 212 further includes a back cushion 260 against which a user can lean when seated on the seat 212. The seat 212 may further include a headrest 262 and other features, such as armrests, a lumbar support, seat heaters, and the like, that are common to vehicle seats generally, but which are not shown in the Figures.

In addition to these features, the seat 212 may include a secondary seat cushion 264. The secondary seat cushion 264 is secured to the seat 212 with any appropriate structure that allows the secondary seat cushion to move between a stored position 266 and a deployed position 268. FIG. 10 shows the seat 212 where the secondary seat cushion 264 is in its deployed position 268. FIG. 11 shows the seat 212 where the secondary seat cushion 264 is in its stored position 266. FIG. 12 is a cross sectional view of the seat 212 taken along line 12-12 of FIG. 10 showing the secondary seat cushion 264 in an intermediate position.

In its stored position 266, the secondary seat cushion 264 may be positioned under the seating surface 258, 259 of the primary seat cushion 254, 255 and may be positioned entirely under the primary seat cushion 254, 255. The seat base 252 may define a recess 270 therein. The secondary seat cushion 264 can be sized and shaped to be positioned in the recess 270 in the seat base 252 in the stored position 266.

In its deployed position 268, the secondary seat cushion 264 may be positioned adjacent the primary seat cushion 254, 255. The secondary seat cushion 264 includes a seating surface 272. In the deployed position 268, the seating surface 272 of the secondary seat cushion 264 maybe placed adjacent the seating surface 258, 259 of the primary seat cushion 254, 255.

In the exemplary embodiment shown in FIGS. 8-12, the primary seat cushion 254, 255 divides along a medial split 273 and is split into a right seat cushion portion 254 and a left seat cushion portion 255. Each of these cushion portions 254, 255 has its own seating surface portion 258, 259, respectively.

The vertical height 256 of the primary seat cushion 254, 255 remains substantially constant when the secondary seat cushion 264 is in its stored 266 and deployed 268 positions. As can be best seen in FIG. 12, the primary seat cushion portions 254, 255 may slide or move laterally with respect to the base 252. The seat may be positioned so that the weight of the seat and any user would be distributed evenly across the base 252.

In the exemplary embodiment shown in FIGS. 8-12, the secondary cushion 264 may be stored internally to the base 252. In such a case, the primary cushion portions 254, 255 may be moved laterally outwardly away from the medial split 273. When the primary cushion portions 254, 255 move outwardly from the medial split 273, the link 274 may also be pulled outwardly. When link 274 is pulled outwardly, it may move the secondary cushion 264 upwardly. In the deployed position 268, the link 274 may desirably be substantially flat across the bottom of the primary cushion portions 254, 255 and secondary cushion 264. In the final deployed position 268, secondary cushion 264 may be positioned between the right primary cushion portion 264 and the left primary cushion portion 265. The link 274 may be designed to cause the movement of the secondary cushion 264 upon inward and outward lateral movement of the primary cushion portions 254, 255, thereby allowing ease of use and movement by a user.

In order to accommodate the lateral movement of the cushion portions 254, 255 and the insertion of the secondary cushion 264, these cushions 254, 255, 264 may be covered by a skin 276. The skin 276 may be made from any material with sufficient elasticity to permit it to deform to allow the lateral movement to the deployed position or be sufficiently flexible and compressible to be folded and inserted between the right and left cushion portions 254, 255 in the medial split 273 in the stored position 266. Alternatively, each cushion 254, 255, 264 can be individually wrapped in a skin.

Additional structures may be provided that lock or hold the parts of the seat 212 in the various configurations. For example, the elements that allow the primary cushion portions 254, 255 to move laterally may include lock structures that secure the cushion portions 254, 255 in position relative to the seat base 252. Such a slide and lock structure could be a structure similar to that used in conjunction with other seats that are permitted to have varying positions, such as the driver's seat. In addition, the link 274 may be configured to allow the secondary cushion 264 to be further locked in place in each of the deployed 256 and stored 258 positions.

Figure 13:
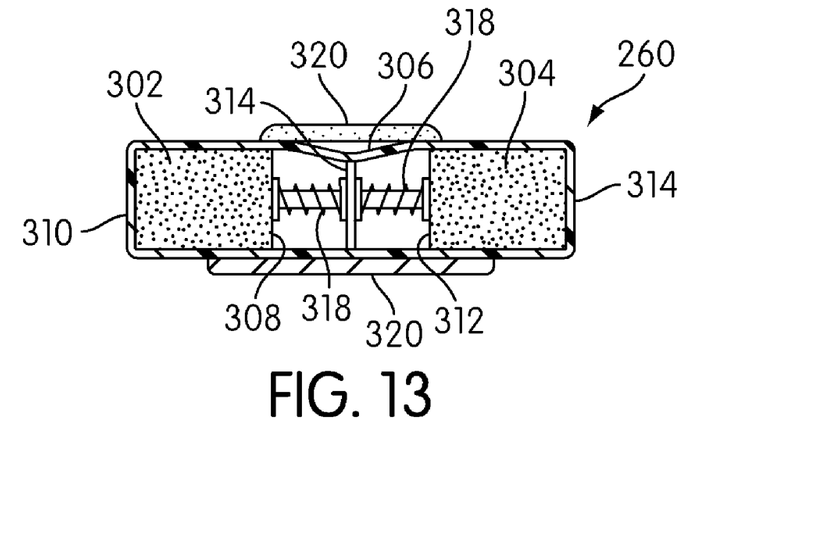
FIG. 13 is a sectional view of a back of an adjustable width seat in an expanded position.
Figure 14:
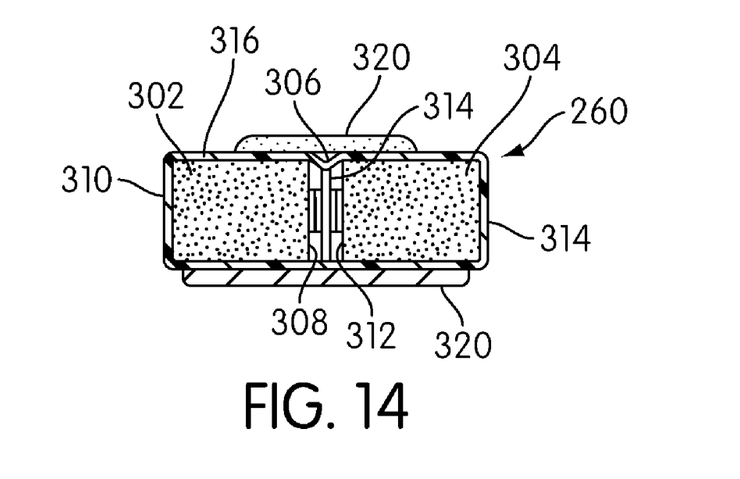
FIG. 14 is a sectional view of a back of an adjustable width seat in a retracted position.

For either of the above two exemplary embodiments or any other exemplary embodiments of the primary cushion, the seat back may expand laterally to conform in width to the primary cushion. FIGS. 13 and 14 are cross sectional views of a back cushion that can be used with any of the seat cushion embodiments described herein or in any other context where a seat back cushion with a variable width is desirable. References are made to FIG. 12, but it will be understood that these reference are not limiting on the situation in which the seat back cushion can be used.

As shown generally in FIG. 12, the seat 212 includes a seat cushion 254, 255, 264 and a back cushion 260. Referring to FIGS. 13 and 14, the back cushion 260 includes a first portion 302, a second portion 304, and a third portion 306. The third portion 306 is positioned intermediate the first portion 302 and the second portion 304. The first portion 302 includes an inner edge 308 and an outer edge 310. The second portion 304 includes an inner edge 312 and an outer edge 314. Each of the first and second portions 302, 304 are positionable in an expanded position as shown in FIG. 13 and in a retracted portion as shown in FIG. 14. As shown in FIG. 14, when the first and second portions 302, 304 are in the retracted position, the inner edge 308 of the first portion 302 is adjacent the inner edge 312 of the second portion 304. As shown in FIG. 13, when the first and second portions 302, 304 are in the expanded position, the inner edge 308 of the first portion 302 is separated from the inner edge 312 of the second portion 304. In this expanded position, the inner edges 308, 312 are bridged by the third portion 306.

The third portion 306 may include additional structure or have additional qualities. The third portion 306 may function as a part of the back cushion 260, and support some weight from a user. Accordingly, a stay 314 may be attached to the skin 316 covering the back cushion 260 about in the middle of the third portion 306. The stay 314 may be a material such as rubber or the like that will provide both stability and compressibility. Additionally, springs 318 may be used to urge the first portion 302 and second portion 304 into their expanded portions. Locking mechanisms (not shown) may be included to allow the first and second portions 302, 304 to be securely positioned in both the retracted and expanded positions. The material for the skin 316 may be any material that gives sufficient elasticity to allow the first and second portions 302, 304 to move between the retracted and expanded positions easily or fold easily into the space between the first and second portions 302, 304 when they are in their retracted position. A headrest 320 may be included on the seat back cushion 310. The headrest 320 may be a conventional headrest and may be made of a single material or a combination of materials.

Figure 15:
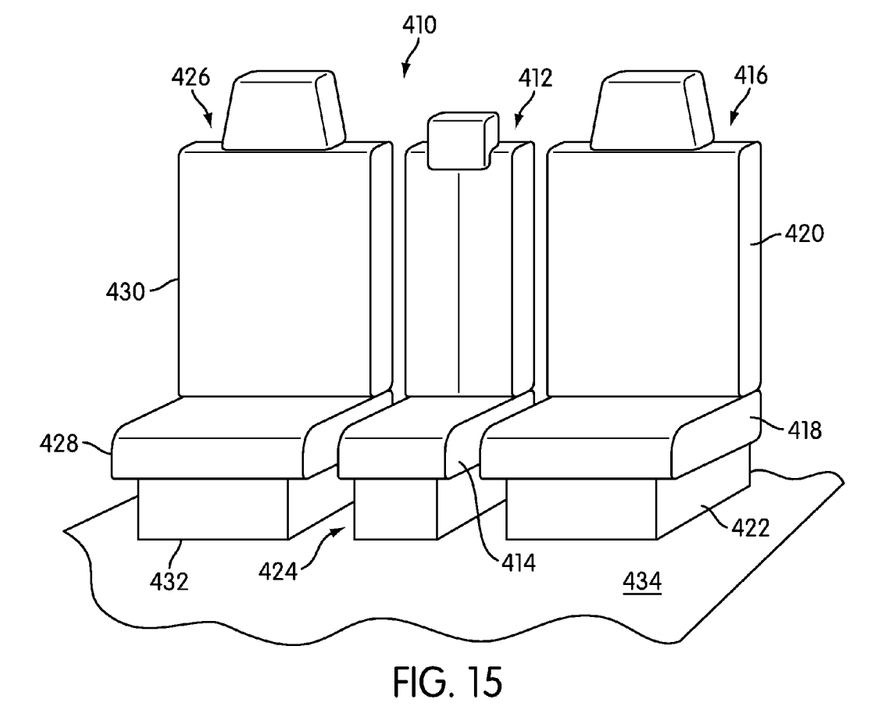
FIG. 15 is a perspective view of a third exemplary embodiment incorporated in a vehicle as a portion of a second row seat.

A third exemplary embodiment may be seen in FIGS. 15-21. As shown in FIG. 15, this exemplary embodiment includes a set of seats 410. The seats 410 include a seat 412 for a vehicle that is described in detail herein. On a left side 414 of the seat 412 is a left seat 416 that includes a left seat cushion 418, a left back 420, and a left base 422. On a right side 424 of the seat 412 is a right seat 426 that includes a right seat cushion 428, a right back 430, and a right base 432. Each of the seat 412, the left seat 416, and the right seat 426 may be separable from a vehicle floor 434. In one exemplary embodiment, the seats 410 may form a second row of seats in a minivan-type vehicle. However, the seats could be positioned anywhere within any vehicle.

Figure 16:
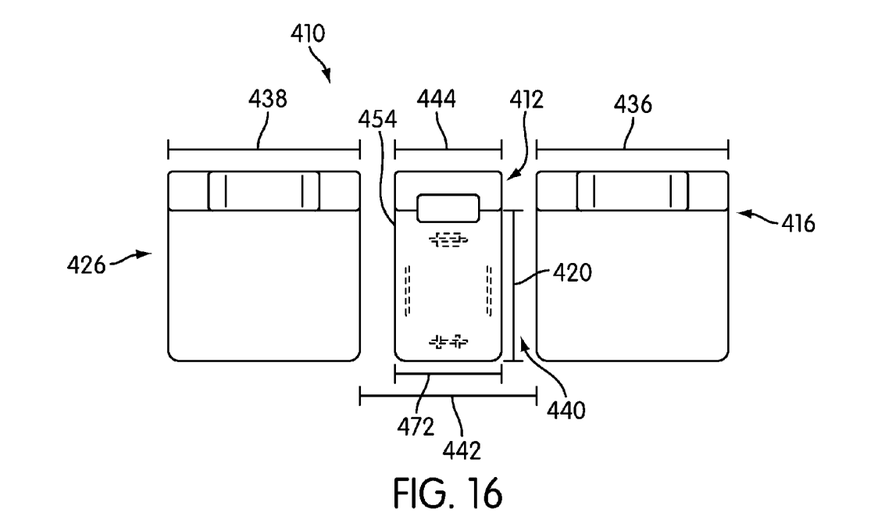
FIG. 16 is a top view of a third exemplary embodiment incorporated in a vehicle as a portion of a second row seat.

FIG. 16 is a top view of the seats 410 of FIG. 16. Left seat 416 has a width 436 and right seat 426 has a width 438. The widths of the seats may be dissimilar. Left seat 416 and right seat 426 may be comparatively wider than seat 412. Left seat 416 and right seat 426 may be designed to be mirror images of one another, in which case width 436 and width 438 will be similar, tending to differ only in the amount of acceptable tolerances in the manufacturing processes. When the left and right seats 416, 426 are positioned on the vehicle floor 434, there is a gap 440 having a width 442 therebetween. The seat 412 may have a width 444 that is less than the width 442 of the gap 440. Spaces 446 and 448 may remain between the seat 412 and each of the left seat 416 and the right seat 426, respectively, when the seat 412 is in a normal position.

Figure 17:
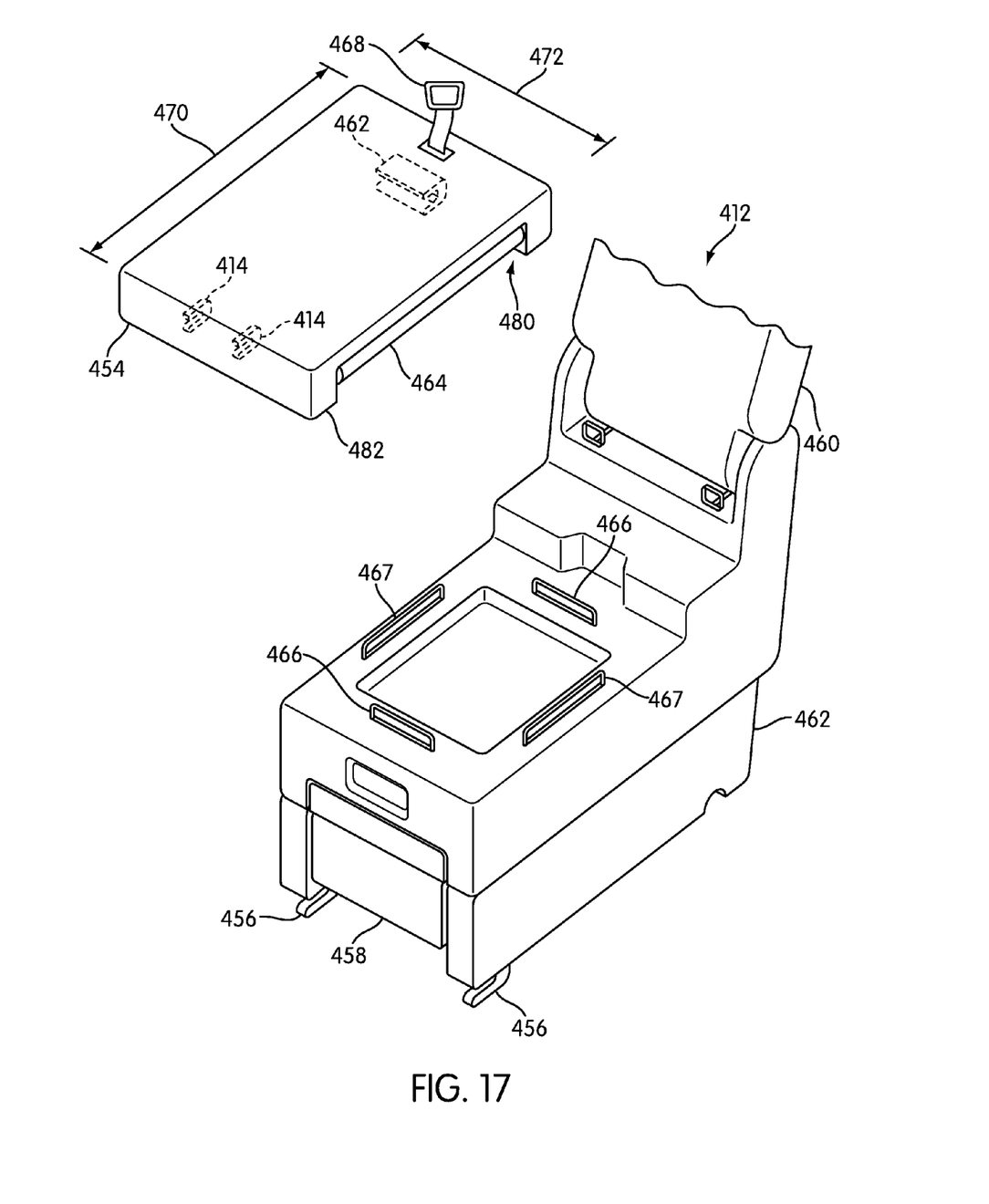
FIG. 17 is an exploded view of a third exemplary embodiment of an adjustable width seat.

In this exemplary embodiment, a seat 412 includes a seat base 452 and a seat cushion 454. The seat base 452 may include various elements. The seat base 452 may include conventional hooks 456 and other attachment structures (not shown) for securing the seat 412 to the floor of a vehicle. The seat base 452 may also include a drawer 458 or other storage structures. The seat 412 also includes a seat back 460 secured to the seat base 452.

In the exemplary embodiment shown in FIGS. 15-21, the seat cushion 454 may be removably secured to the seat base 452 through cooperative structures. Attachment structures, such as latches 462, 464 may be secured to the underside of the seat cushion 454 and configured to mate with rails 466, 467 on the seat base 452. A user can pull a strap 468 on the cushion 454 to separate the seat cushion 454 from the seat base 452. The seat base 452 may include rails 466 that mate with the latches 462, 464 to attach the seat cushion 454 to the seat base in a first position. The seat base 452 may also include rails 467 that mate with the latches 462, 464 to attach the seat cushion 454 to the seat base 452 in a second position.

Figure 18:
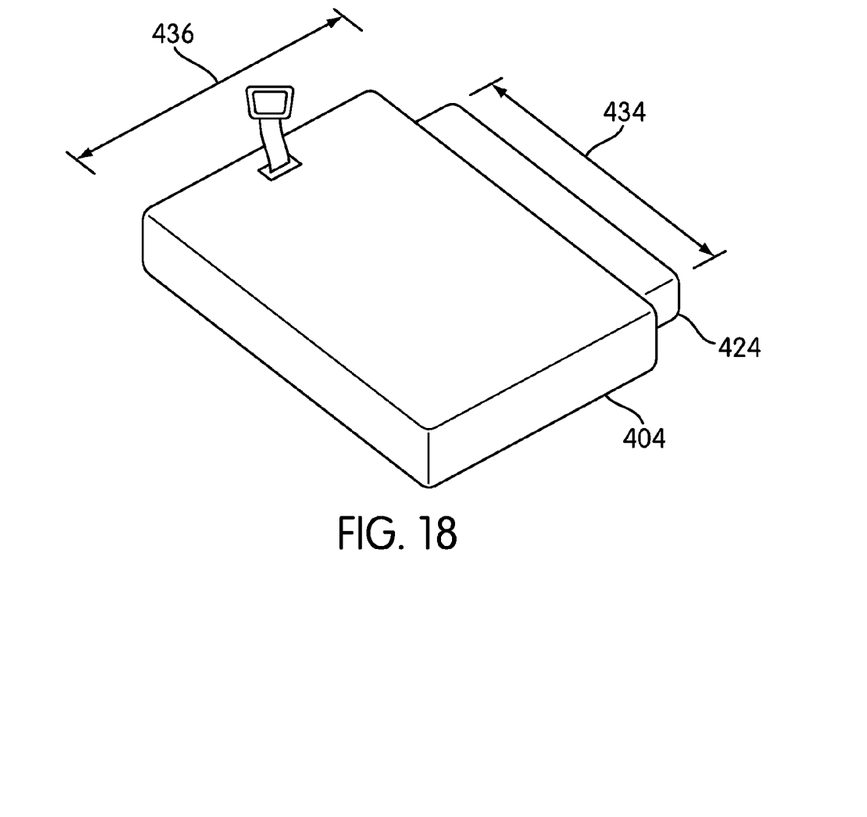
FIG. 18 is a perspective view of the cushion of the third exemplary embodiment of the adjustable width seat.
Figure 19:
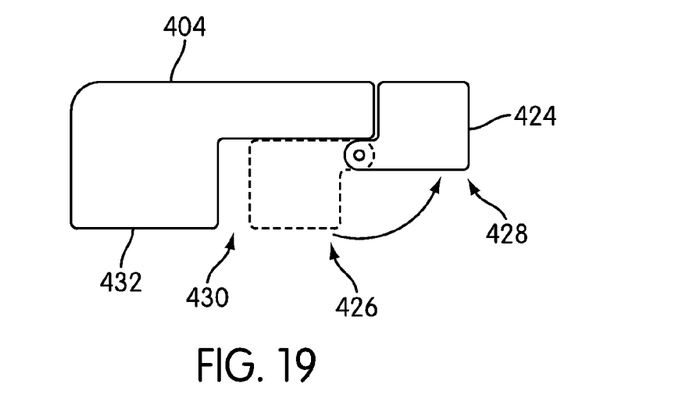
FIG. 19 is a side view of the cushion of the third exemplary embodiment of the adjustable width seat.
Figure 20:
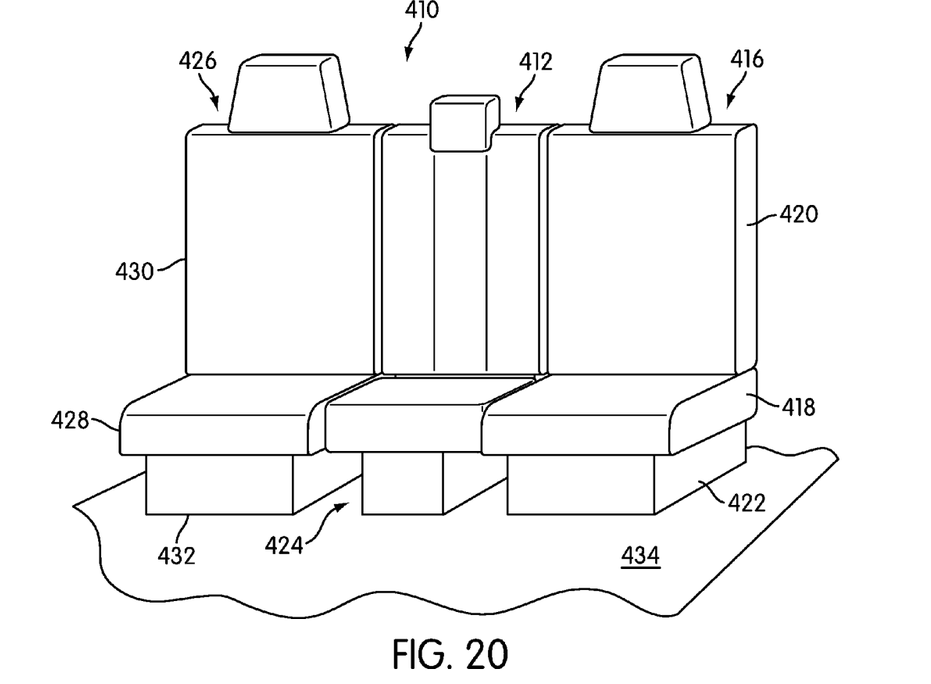
FIG. 20 is a perspective view of a third exemplary embodiment incorporated in a vehicle as a portion of a second row seat with a supplemental cushion in its deployed position.
Figure 21:
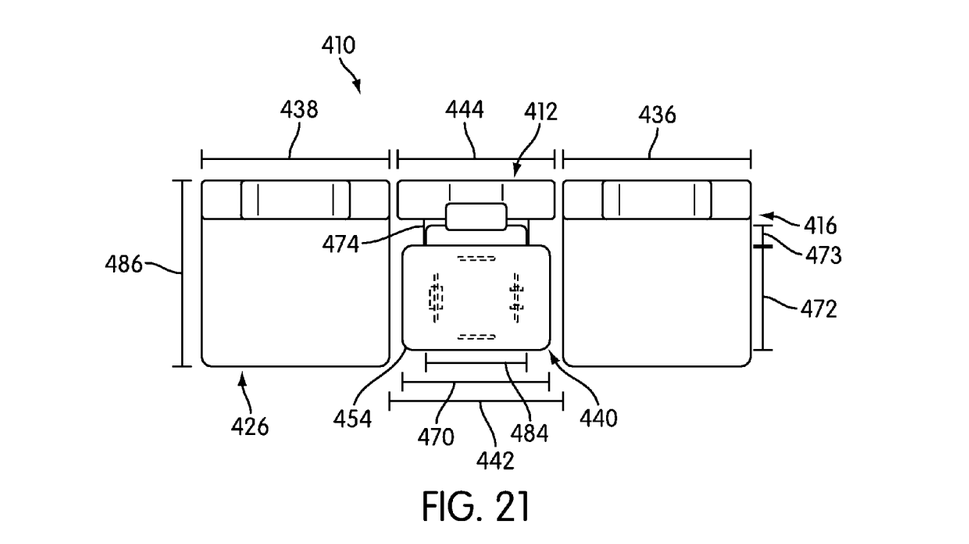
FIG. 21 is a top view of a third exemplary embodiment incorporated in a vehicle as a portion of a second row seat with a supplemental cushion in its deployed position.

The seat cushion 454 has a length 470 and a width 472. The length 470 of the seat cushion 454 may be greater than the width 472. When the seat cushion 454 is attached to the seat base in the first position, the effective width of the seat cushion 454 is the width 472. When the seat cushion 454 is attached to the seat base in the second position, the effective width of the seat cushion 454 is the length 470. Accordingly, when the seat cushion 454 is in the second position, its effective width is greater than when it is in the first position.

In some exemplary embodiments, a supplemental cushion 474 can be secured to the seat cushion 454. As may be best seen in FIG. 19, the supplemental cushion 474 can be rotationally secured to the seat cushion 454 with conventional structures. The supplemental cushion 474 can be positioned in a stored position 476 shown in dashed lines and a deployed position 478 shown in solid lines in FIG. 19. In the stored position 476, the supplemental cushion 474 may be positioned under the seat cushion 454. In one exemplary embodiment, the supplemental cushion 474 may be positioned in a recess 480 in an underside 482 of the seat cushion 454. In the deployed position 478, the supplemental cushion 474 may be positioned adjacent the seat cushion 454.

The supplemental cushion 454 can be used to change the effective length of the cushion 454 for the comfort of passengers, aesthetic reasons, or for any reason whatsoever. The use of the combination of cushions is most clearly seen in FIGS. 20-21 and by comparing FIGS. 20 and 21 to FIGS. 15 and 16. The length 484 of the supplemental cushion 474 may be about the same as the width 472 of the cushion 454. Thus, when the supplemental cushion 474 is in the deployed position 478 and the cushion 454 is attached in the second position, the supplemental cushion 474 will cover the portion of the seat base 452 that would have been covered by a rear portion of the cushion 454 if it were attached in the first position. Similarly, when the seat cushion 454 is attached in the second position and the supplemental cushion 474 is in its deployed position 478, the effective length 486 of the cushion 454 is the width 472 of the cushion and the width 473 of the supplemental cushion 474. It is desirable that the effective length 486 be about the same as the length 470 of the cushion 454.

Figure 22:
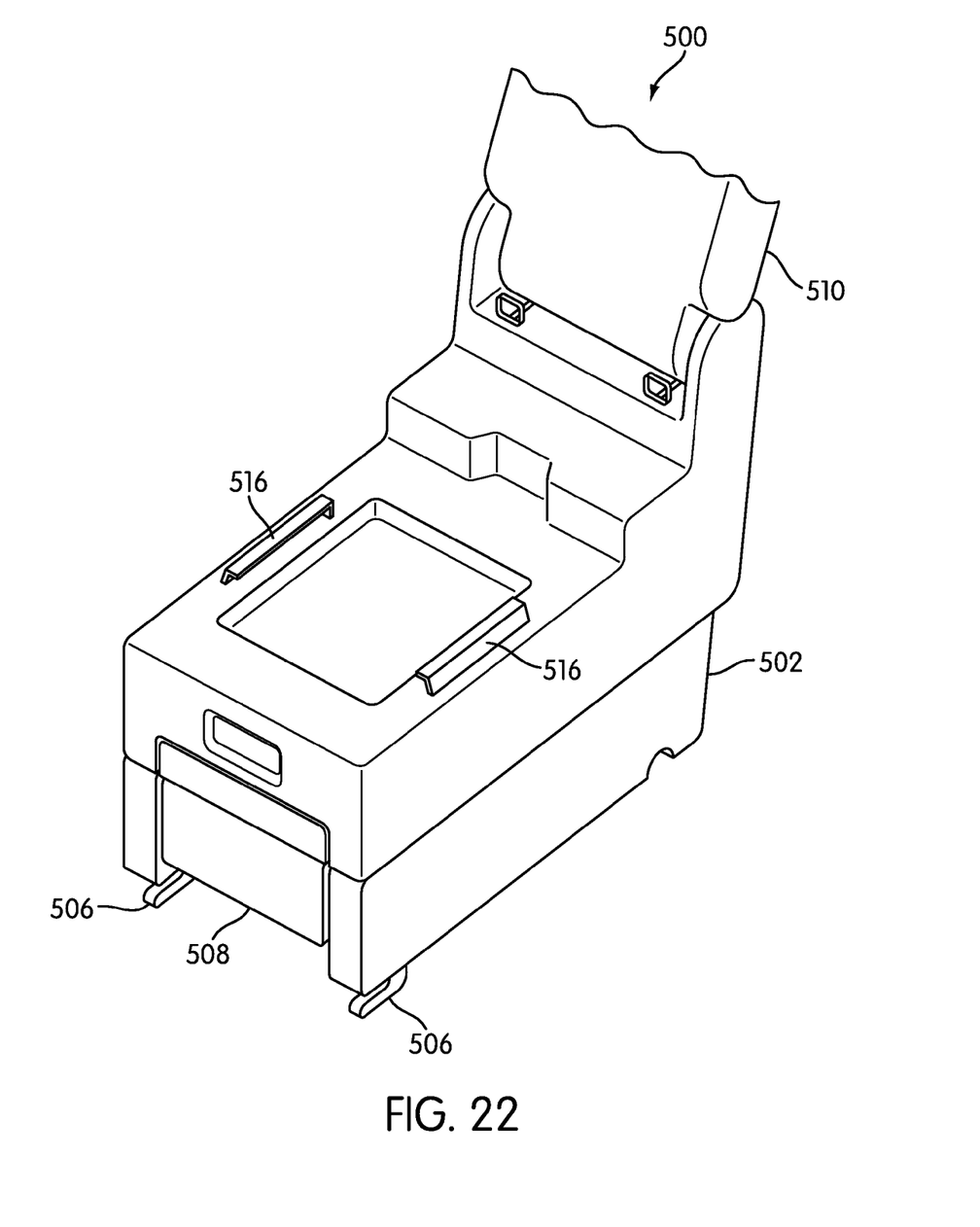
FIG. 22 is perspective view of a fourth exemplary embodiment of the adjustable width seat with the cushion removed.
Figure 23:
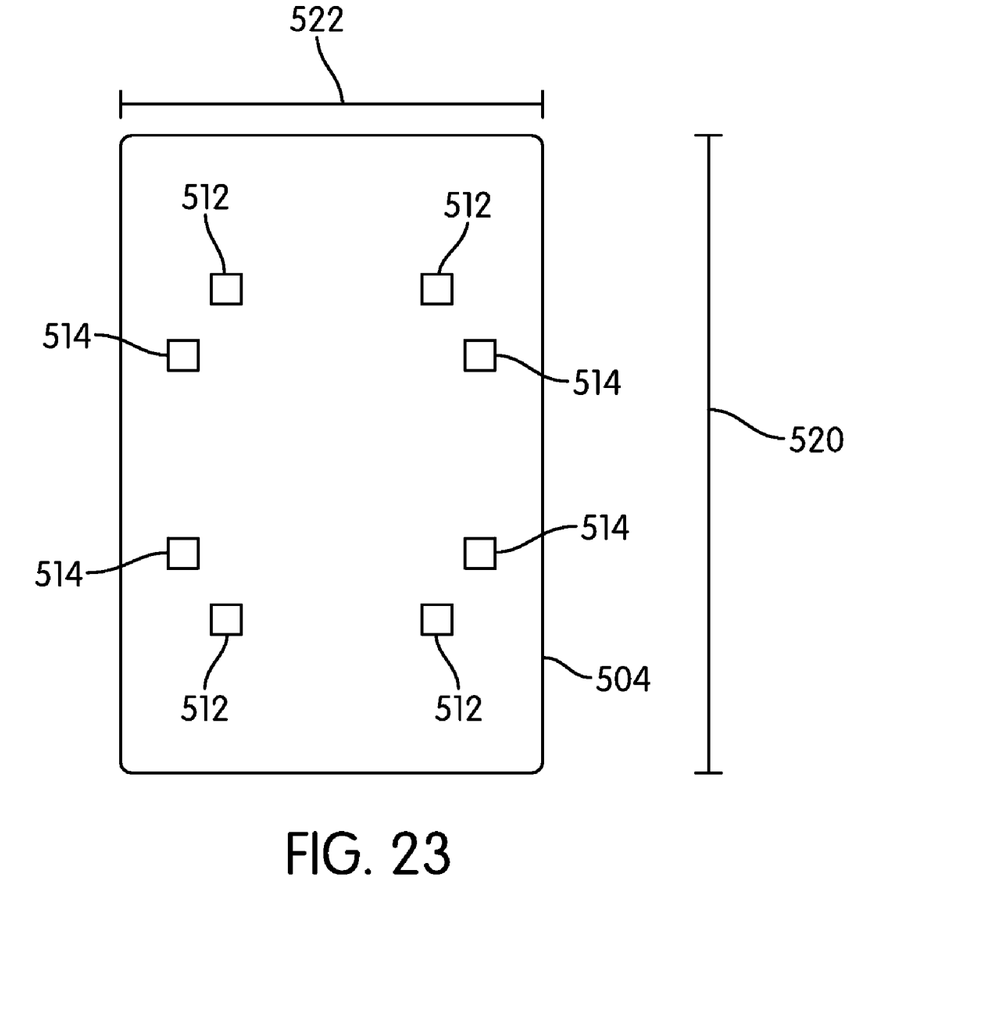
FIG. 23 is a plan view of the lower side of the cushion of the fourth exemplary embodiment of the adjustable width seat.

A fourth exemplary embodiment is shown in FIGS. 22 and 23. The embodiment shown in FIGS. 22 and 23 is similar to that shown in FIGS. 15-21 except that the structure for securing the seat cushion 504 to the seat base 502 differs.

In this exemplary embodiment, a seat 500 includes a seat base 502 and a seat cushion 504. The seat base 502 may include various elements. The seat base 502 may include conventional hooks 506 and other attachment structures (not shown) for securing the seat 500 to the floor of a vehicle. The seat base 502 may also include a drawer 508 or other storage structures. The seat 500 also includes a seat back 510 secured to the seat base 502.

In the exemplary embodiment shown in FIGS. 22 and 23, the seat cushion 504 is removably secured to the seat base 502 through cooperative structures. Attachment structures, such as mating grooves 512, 514 may be secured to the underside of the seat cushion 504 and configured to slide to mate with mating grooves 516 on the seat base 402. The seat cushion 504 may include grooves 512 that slide to mate with the seat base grooves 516 to attach the seat cushion 504 to the seat base 502 in a first position. The seat cushion 504 may also include grooves 514 that slide to mate with the seat base grooves 516 to attach the seat cushion 504 to the seat base 502 in a second position.

The seat cushion 504 has a length 520 and a width 522. The length 520 of the seat cushion 504 may be greater than the width 522. When the seat cushion 504 is attached to the seat base 502 in the first position, the effective width of the seat cushion 504 is the width 522. When the seat cushion 504 is attached to the seat base 502 in the second position, the effective width of the seat cushion 504 is the length 520. Accordingly, when the seat cushion 504 is in the second position, its effective width is greater than when it is in the first position.

The exemplary embodiment shown in FIGS. 22 and 23 does not include the details of a supplemental cushion. However, a person having ordinary skill in the art of vehicle seat design can easily incorporate a supplemental cushion such as that shown in FIGS. 15-21 into the seat cushion 504.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A seat for a vehicle, comprising:
    a seat base;
    a primary seat cushion supported at a vertical height on the seat base and having a seating surface;
    a secondary seat cushion pivotably secured to said primary seat cushion and having a seating surface, a stored position and a deployed position, wherein
        in the stored position the secondary seat cushion is positioned under the seating surface of the primary seat cushion, and
        in the deployed position the secondary seat cushion is positioned laterally adjacent at least a portion of the primary seat cushion;
    the vertical height of the primary seat cushion remains constant when the secondary seat cushion is in its stored and deployed positions; and
    at least a portion of the primary seat cushion is laterally movable with respect to the seat base.

2. The seat for a vehicle according to claim 1, wherein the entire primary seat cushion is laterally movable.

3. The seat for a vehicle according to claim 1, wherein the primary seat cushion is positioned between a left seat cushion and a right seat cushion.

4. The seat for a vehicle according to claim 1, wherein the secondary seat cushion is positioned in a recess in the seat base in the stored position.

5. The seat for a vehicle according to claim 1, wherein the primary cushion divides along a medial split.

6. The seat for a vehicle according to claim 1, further including a back cushion that divides along a medial split.

7. The seat for a vehicle according to claim 1, wherein the deployed position of the secondary seat cushion is beside the primary seat cushion.

8. The seat for a vehicle according to claim 1, wherein the deployed position of secondary seat cushion is between two portions of the primary cushion.

9. A seat for a vehicle, comprising
    A seat base; and
    A seat cushion removably attached to the seat base, wherein the seat cushion is configured to attach to the seat base in a first position and a second position, an effective width of the seat cushion being greater in one of the first and second positions than an effective width in the other of the first and second positions.

* * * * *